UNITED STATES PATENT OFFICE.

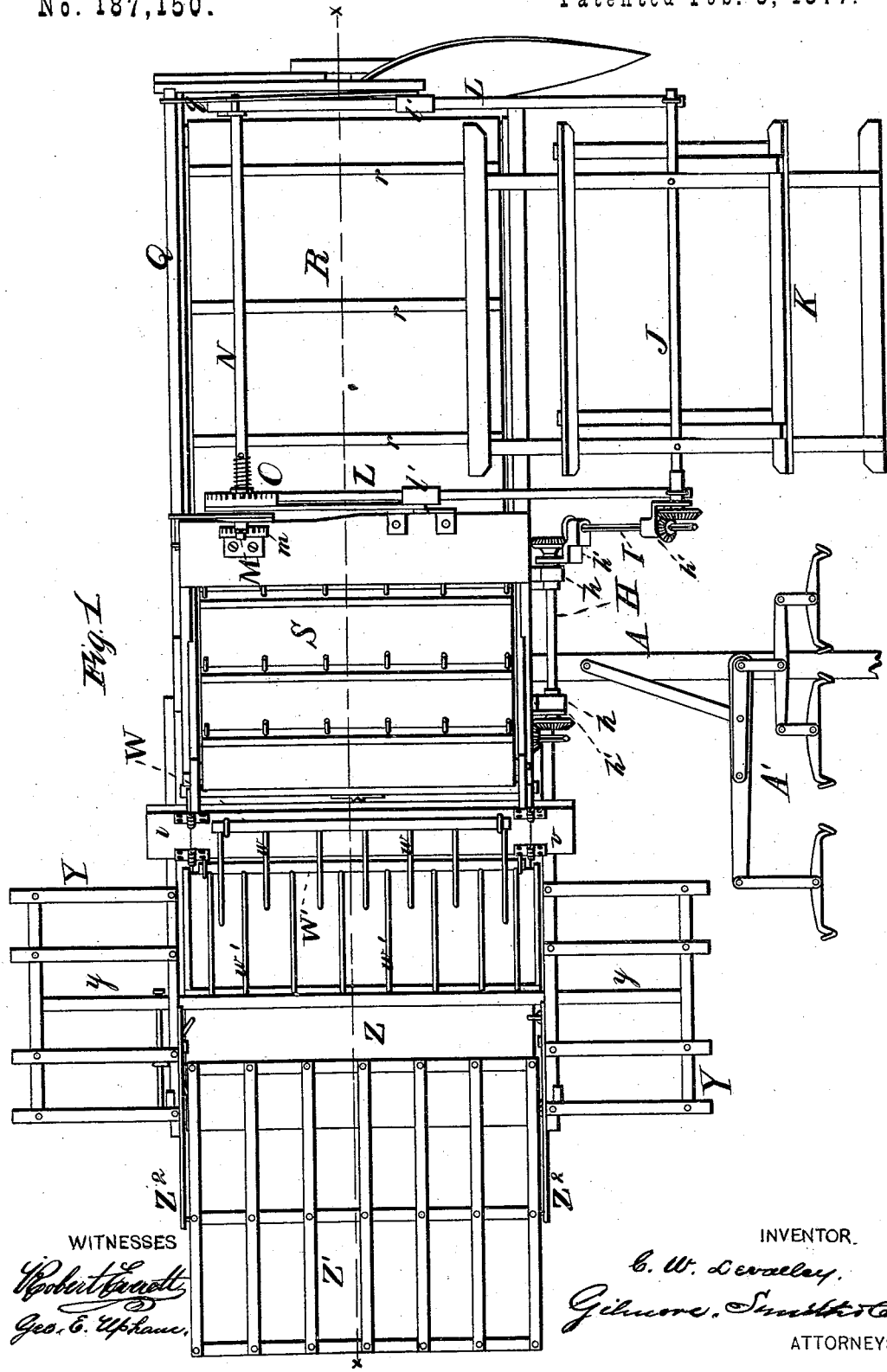

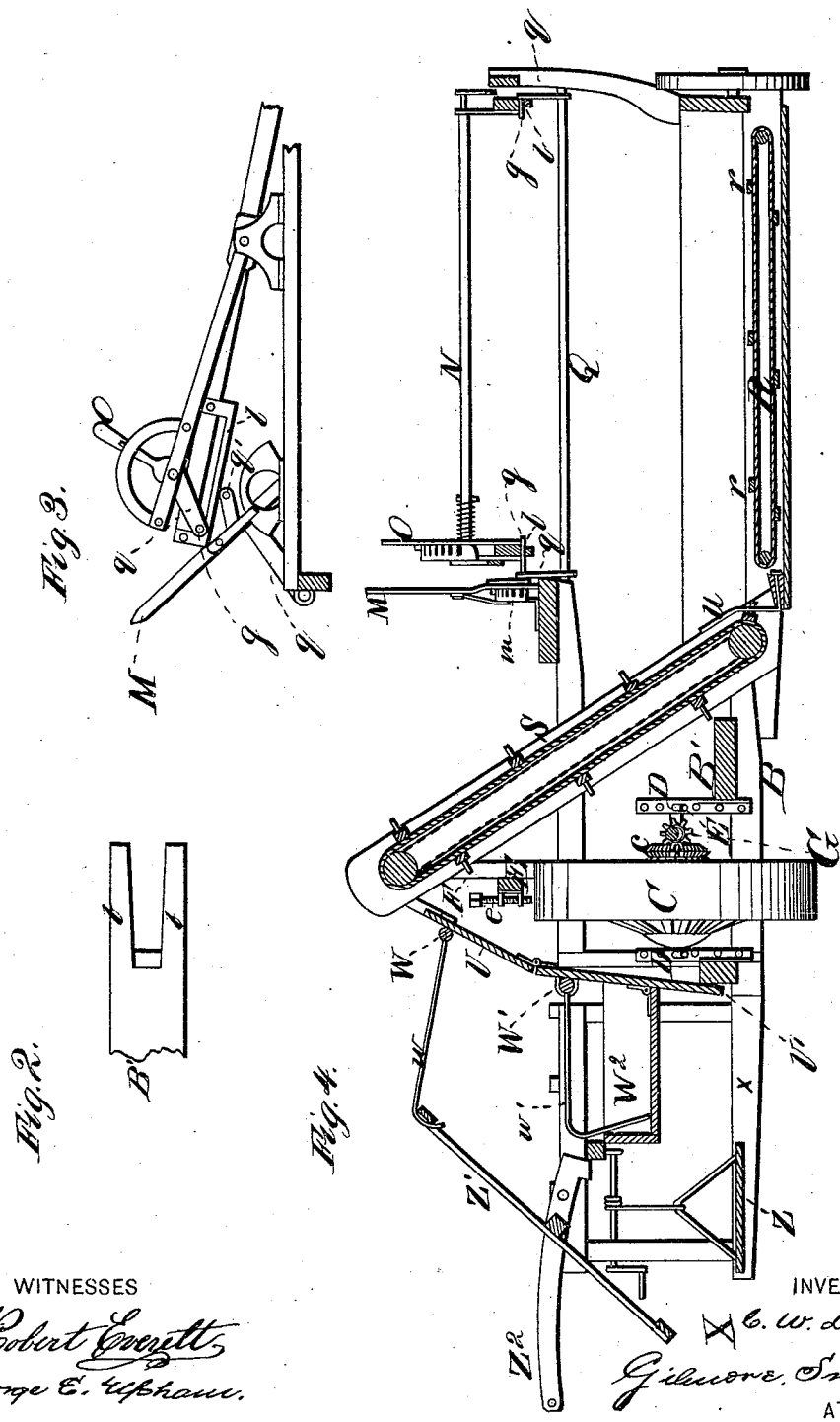
C. W. LEVALLEY.
HARVESTER.
No. 187,150.   Patented Feb. 6, 1877.
2 Sheets—Sheet 2.
WITNESSES
Robert Everett
George E. Upham.
INVENTOR.
C. W. Levalley.
Gilmore, Smith & Co.
ATTORNEYS

CHRISTOPHER W. LEVALLEY, OF ST. PAUL, MINNESOTA.

IMPROVEMENT IN HARVESTERS.

Specification forming part of Letters Patent No. 187,150, dated February 6, 1877; application filed June 17, 1876.

*To all whom it may concern:*

Be it known that I, CHRISTOPHER W. LEVALLEY, of St. Paul, in the county of Ramsey and State of Minnesota, have invented a new and valuable Improvement in Harvesters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my harvester, and Figs. 2 and 3 are detail views of the same. Fig. 4 is a longitudinal vertical sectional view thereof.

This invention relates to harvesters; and the nature of my invention consists in the novel construction and arrangement of the devices, as will be hereinafter more fully set forth, and pointed out in the claims.

In the accompanying drawings, A designates a draft-tongue, which is attached to the frame-work B of the harvester, between the split ends $b\ b$ of cross-bar B' of said frame, which ends act as hounds for said draft-tongue A. A' designates a three-horse equalizer of any ordinary construction, which may be pivoted to draft-tongue A. C designates the driving and transporting wheel, which is provided on one side of its hub with bevel-gear $c$, and journaled in slotted bearings D, which are rigidly secured to harvester-frame B, and are provided with side perforations and removable cross-pin. E is a cross-bar rigidly connected to standards F F of frame B, and provided with screw $e$ or its equivalent, that bears on the periphery of wheel C and operates to raise frame B. G is a rotating shaft, provided with bevel-gears at each end, and pivoted at the lower end to one of the journals of wheel C. H is a second rotating shaft, and I a third, each one being bevel-geared at or near its ends, so as to form a continuous geared connection between gear $c$ on the hub of wheel C and the bevel-gear on rotating shaft J of reel K. Shaft H is hung from harvester-frame B in brackets $h\ h$; and shafts G and H, H and I, and I and J are respectively coupled by elbow-brackets $h'\ h'\ h'$. This arrangement allows shaft G' to accommodate itself to all the adjustments of harvester-frame B without severing gear-connection with gear $c$ on the hub of wheel C. It also allows shaft I to accommodate itself in like manner to the adjustments of the bevel-gear on the end of shaft J, as said shaft J and reel K are adjustable vertically, and to or from the platform.

The adjustment of said reels are effected by the following devices: L L are bars which are arranged parallel to the line of draft, and slide in sleeves $l'\ l'$, by which means they are pivoted to brackets rigidly attached to the main frame of the harvester or to standards thereon. Bars L L carry shaft J and reel K on their front ends, and are slotted longitudinally at their rear ends at $l\ l$. In slots $l\ l$ play pins $g\ g$, which are on the ends of arms $q\ q$, rigidly attached to transverse rear rock-shaft Q. To the outer end of one of these arms $q$ is linked a lever, M, which is pivoted to the frame-work of the harvester, and is governed by notched segment $m$. The rocking of this lever causes the rear end of bars L L to tip up or down, thereby effecting the vertical adjustment of reel K. A second rock-shaft, N, is linked to the rear ends of bars L L, and also to pivoted sleeves $l'\ l'$. This rock-shaft also carries a notched segment, which governs the vibrations of a lever, O, that is connected to the rear end of one of the bars L, and is hooked or slotted so as to pivot upon rock-shaft N at a point above bar L. This rod or lever O operates to move bars L and reel K forward or back.

By operating levers M and O at the same time, both the vertical adjustment of the reel and its forward and backward adjustment are simultaneously effected.

R is a traveling platform, which may consist of an endless apron, provided with cross-slats $r\ r$. Its office is to receive the grain from reel K and to deliver it to elevator S, which may consist of a similar endless apron and cross-slats. Between platform R and elevator S I arrange a rack or series of teeth, $u$, which are adapted to be bent back, so as to be struck by the heads of the grain and to compel the same to lie regularly—butts foremost—when presented to elevator S.

V and V' are shields or grain-boards, hinged together, and used for protecting the chains of the elevator and the gear-connections already described. To more perfectly effect this protection, upper shield V is provided with hinged side extensions $v\ v$. These extensions may be folded on upper shield V, and the two shields may then be folded together, back to back, so as to occupy but little space and be out of the way. The lower end of lower shield V' hangs loosely. Upper shield V carries rock-shaft W, which is provided with a rack of straight rods, $w$, and lower shield V' is in like manner provided with a lower rock-shaft, $W^1$, which has rectangular or curved rods $w'$, that constitutes a rack-cover for a trough or box, $W^2$. This trough is secured on shield V', and serves to catch the shelled grain which falls through the bars $w'$. X designates the binder-frame, which is pivoted to the main frame B of the harvester by arms $x\ x$, the inner ends of which catch under cross-bar B', and so prevent the binders' frame from falling below a horizontal position. By reason of its being pivoted, binders' frame X can be thrown or folded up out of the way when desired. This frame is provided in front and rear with slatted binding-tables or shelves Y Y, each of which has an open space in the middle $y\ y$, for convenience in binding. Binders' frame X is also provided with a stand or a seat, Z, for the operators, which is parallel to the line of draft, and is made adjustable vertically at its rear end, so as to bring the binders nearer to, or farther from, the ground, to compensate for the tipping of the harvester to the front or rear. This adjustment may be effected by a rope and rotating shaft, as shown, or by any equivalent mechanism—for instance, a crank, pinion, and rack.

In practice, straight tines $w$ on rock-shaft W remain above the top of elevator S until a sufficient amount of grain is carried up against them to force them over. Their load of grain is then deposited on rods $w'$, which constitute the cover of trough $W^2$, whence said grain is taken by the operator, who runs his arm between said rods $w'$ to get a grasp on said grain, and then binds the same on one of the binding-tables or shelves Y Y, while, at the same time, the straight rods $w$ are thrown up into their former position, to receive another load. Curved or right angled rods $w'$ on rock-shaft $W^1$ may be thrown up out of the way to allow the shelled grain to be removed from trough $W^2$.

In case grain is to be harvested which is too short to be bound, or which for any other reason is to remain unbound, I make use of a rectangular slatted frame or bundle-carrier, $Z^1$, which is pivoted, with its axis running longitudinally with respect to the line of draft, to rods $Z^2\ Z^2$, that are also pivoted by one end of each rod to the binder-frame X. The grain is delivered by straight rods $w$ upon this bundle-carrier $Z^1$ until a sufficient weight of grain has accumulated thereupon to compel such bundle-carrier $Z^1$ to tip outward and discharge the grain in piles about the field. Arms $Z^2$ are perforated at several points, so as to make carrier $Z^1$ adjustable in its bearings to or from the main part of the harvester. Bundle-carrier $Z^1$ is made a little heavier on the inner side than on the outer, so as to allow said carrier to remain horizontal, or nearly so, until a considerable quantity of grain has accumulated upon it.

What I claim as new, and desire to secure by Letters Patent, is—

1. The combination, substantially as hereinbefore described, of a harvester-frame, having slotted bearings D, drive-wheel C, cross-bar E, and adjusting-screw $c$, or its equivalent, whereby the frame can be raised or lowered on the drive-wheel, as set forth.

2. In combination with lever O, rock-shaft N, sleeves $l'\ l'$, and connecting-links and bars L, slotted at $l$, and sliding in said sleeves, as and for the purpose set forth.

3. In a harvester, rack-frame or rods $w\ w$, in combination with dropper $Z^1$, operating substantially in the manner as set forth.

In testimony that I claim the above I have hereunto subscribed my name in the presence of two witnesses.

CHRISTOPHER W. LEVALLEY.

Witnesses:
H. L. PILKINGTON,
R. C. MOORE.